United States Patent [19]

Iwaki et al.

[11] Patent Number: 5,319,555
[45] Date of Patent: Jun. 7, 1994

[54] VEHICLE AUTOMATIC TRANSMISSION CONTROL SYSTEM FOR CONTROLLING THE SPEED CHANGE RATIO BASED ON DRIVING RESISTANCE

[75] Inventors: Yoshihisa Iwaki; Ichiro Sakai; Shinichi Sakaguchi, all of Saitama, Japan

[73] Assignee: Honda Giken Kogyo Kabushiki Kaisha, Tokyo, Japan

[21] Appl. No.: 940,607

[22] Filed: Sep. 4, 1992

[30] Foreign Application Priority Data

Sep. 12, 1991 [JP] Japan .................................. 3-260954

[51] Int. Cl.⁵ ...................... F16D 21/04; G06F 15/50; G06G 7/70
[52] U.S. Cl. ............................ 364/424.1; 364/424.02; 477/98; 477/120; 477/902; 477/903; 477/904
[58] Field of Search ........... 364/424.1, 426.02, 424.02; 74/866, 867; 192/4 A, 0.032, 0.052; 474/28; 180/248; 123/561

[56] References Cited

U.S. PATENT DOCUMENTS

| | | | |
|---|---|---|---|
| 4,166,657 | 9/1979 | Blomberg et al. | 303/116 |
| 4,509,628 | 4/1985 | Junginger et al. | 192/0.094 |
| 4,551,802 | 11/1985 | Smyth | 364/424.1 |
| 4,576,065 | 3/1986 | Speranza et al. | 74/866 |
| 4,653,621 | 3/1987 | Oshiage | 192/0.032 |
| 4,754,835 | 7/1988 | Selter et al. | 180/248 |
| 4,803,628 | 2/1989 | Hayashi et al. | 364/424.1 |
| 4,870,582 | 9/1989 | Hoashi et al. | 364/426.02 |
| 4,999,778 | 3/1991 | Ruhl et al. | 364/426.02 |
| 5,021,958 | 6/1991 | Tokoro | 364/426.04 |
| 5,032,108 | 7/1991 | Taniguchi et al. | 474/28 |
| 5,036,730 | 8/1992 | Sakai et al. | 74/866 |
| 5,048,650 | 9/1991 | Takizawa | 192/4 A |
| 5,050,455 | 9/1991 | Yamashita et al. | 74/866 |
| 5,051,908 | 9/1991 | Shiraishi | 364/426.02 |
| 5,067,374 | 11/1991 | Sakai et al. | 74/866 |
| 5,079,704 | 1/1992 | Sakai et al. | 364/424.1 |
| 5,079,705 | 1/1992 | Sakai et al. | 364/424.1 |
| 5,099,969 | 3/1992 | Ohtake | 192/0.052 |
| 5,105,359 | 4/1992 | Okubo | 364/426.02 |
| 5,117,799 | 6/1992 | Suzuki et al. | 123/561 |
| 5,124,916 | 6/1992 | Tokoro et al. | 364/424.1 |
| 5,151,861 | 9/1992 | Danno et al. | 364/424.02 |

FOREIGN PATENT DOCUMENTS

| | | |
|---|---|---|
| 0312276 | of 1989 | European Pat. Off. . |
| 377953A2 | of 1990 | European Pat. Off. . |
| 377953A3 | of 1990 | European Pat. Off. . |
| 2852195 | of 1980 | Fed. Rep. of Germany . |
| 4020201 | of 1991 | Fed. Rep. of Germany . |
| 2513579 | of 1983 | France . |
| 63-246546 | 10/1988 | Japan . |
| 1112059 | 4/1989 | Japan . |

Primary Examiner—Thomas G. Black
Assistant Examiner—Jacques H. Louis-Jacques
Attorney, Agent, or Firm—Lyon & Lyon

[57] ABSTRACT

In a system for controlling a gear ratio of a multi-step geared or continuously variable automatic transmission of a vehicle based on determined parameter indicative of operating condition of the vehicle including a driving resistance, the driving resistance is calculated in an equation in which motive force−driving resistance=−vehicle mass×acceleration using the law of motion. In the first embodiment, the calculation is carried out, without using a torque sensor, by applying an adjustment for torque consumption by a device such as an air conditioner and a torque loss caused by braking. In the second and third embodiments, the driving resistance is calculated using a torque sensor. Thus, with the arrangement, the driving resistance can be accurately determined applying appropriate adjustment, a gear ratio to be shifted is properly determined in any traveling condition including hill climbing.

9 Claims, 12 Drawing Sheets

| Rule number | Subject | Antecedent | | | Conclusion | Rule meaning |
|---|---|---|---|---|---|---|
| 1 | Hill-climbing | 0.5 / 100 192(kg) Driving resistance | 0.9 / 0 84(deg) θ_TH | 1.0 / 20 40 250 V(km/h) | 0.2 / 1 2 3 4 Current gear | 0.2 / -3 -2 -1 0 1 2 3 Gear (ratio) | During hill-climbing if degree of throttle opening is small, then shift down greatly (raise gear ratio greatly). |

VEHICLE AUTOMATIC TRANSMISSION CONTROL SYSTEM FOR CONTROLLING THE SPEED CHANGE RATIO BASED ON DRIVING RESISTANCE

BACKGROUND OF THE INVENTION

1. Field of the Invention

This invention relates to a vehicle automatic transmission control system, more particularly to a vehicle automatic transmission control system of the type in which the driving resistance is calculated and used as a parameter for determining control values, and still more particularly to such a vehicle automatic transmission control system which enables the driving resistance to be calculated with high precision.

2. Description of the Prior Art

The conventional electronic vehicle automatic transmission control system is generally equipped with a memory device storing a two dimensional shift diagram as a map, hereinafter referred to as "shift diagram map" and the gear ratio is determined by retrieval from the map using the throttle opening and the vehicle speed as address data. Since the shift diagram map is prepared assuming only general driving conditions, however, it does not always enable the selection of an appropriate gear ratio during hill-climbing and other special driving conditions. A number of systems have been developed for overcoming this problem. For example, Japanese Laid-open Patent Publication No. 1(1989)-112059 teaches a system which calculates the driving resistance and uses the result for correcting the map-retrieved gear ratio, while Japanese Laid-open Patent Publication No. 63(1988)-246546 discloses a system which determines the gear ratio through fuzzy reasoning based on operating parameters including the driving resistance, without using the shift diagram map. The assignee also provided control systems of the latter type in Japanese Laid-open Patent Publications No. 2(1990)-3739 and No. 2(1990)-85563 (also filed in the United States to mature as U.S. Pat. No. 5,036,730 and filed in EPO under 89306192.9); No. 2(1990)-3738 (also filed in the United States to mature as U.S. Pat. No. 5,079,705 and filed in EPO under 89306167.1); No. 2(1990)-138,558 and No. 2(1990)-138,561 (also filed in the United States to mature as U.S. Pat. No. 5,067,374 and filed in EPO under 89311976.8); No. 2(1992)-138,559, No. 2(1992)-138,560 and No. 2(1990)-150,558 (also filed in the United States to mature as U.S. Pat. No. 5,079,704 and filed in EPO under 89311970.1); and No. 4(1992)-8964 (also filed in the United States under 691,066 and filed in EPO under 91303878.2).

While it is well known that the driving resistance is the sum of such individual resistances as the rolling resistance, the aerodynamic drag and the like, precise measurement of the driving resistance of a vehicle is possible only under strictly controlled indoor test conditions and is very difficult under actual driving conditions. The aforementioned Japanese Patent Publication No. 63(1988)-246546 therefore uses a driving resistance value obtained by simulation. However, such a simulation value only roughly approximates the actual driving resistance and cannot be considered to reflect it with a very high degree of accuracy. It was in the light of this situation that the assignee proposed the method of computing driving resistance disclosed in the aforesaid Japanese Patent Publication No. 4(1992)-8,964 (U.S. Ser. No. 691,066).

SUMMARY OF THE INVENTION

An object of the invention is to provide an automatic transmission control system that is an improvement on this earlier driving resistance computation technology developed by the assignee and which, by making it possible to determine the driving resistance with higher precision, enables determination of the most appropriate gear ratio with high reliability.

For realizing this object, the present invention provides a system for controlling a gear ratio of a multi-step geared or continuously variable automatic transmission of a vehicle based on determined parameters indicative of operating conditions of the vehicle including a driving resistance calculated by driving resistance calculating means. In the system the improvement comprises said driving resistance calculating means comprising first means for determining output torque generated by the vehicle engine at least from an engine speed and an engine load in accordance with predetermined characteristic, second means for adjusting the determined torque by subtracting torque consumption of a device to be driven by the vehicle engine and adjusting for transmission lag in n-th order and for calculating motive force the vehicle generates by multiplying the adjusted torque by overall gear ratio and transmission efficiency and by dividing the product by vehicle tire radius and third means for determining a vehicle acceleration from a frequency signal less than a predetermined frequency and by multiplying the determined vehicle acceleration by vehicle mass, to determine force required for acceleration, and then to determine a driving resistance by subtracting the determined force from the motive force.

BRIEF DESCRIPTION OF THE DRAWINGS

These and other objects and advantages of the invention will be more apparent from the following description and drawings, in which.

DETAILED DESCRIPTION OF THE PREFERRED EMBODIMENTS

Preferred embodiments of the present invention will be explained with reference to a system, as an example, which controls the gear ratio of multi-step automatic transmission through a fuzzy reasoning.

Figure 1:
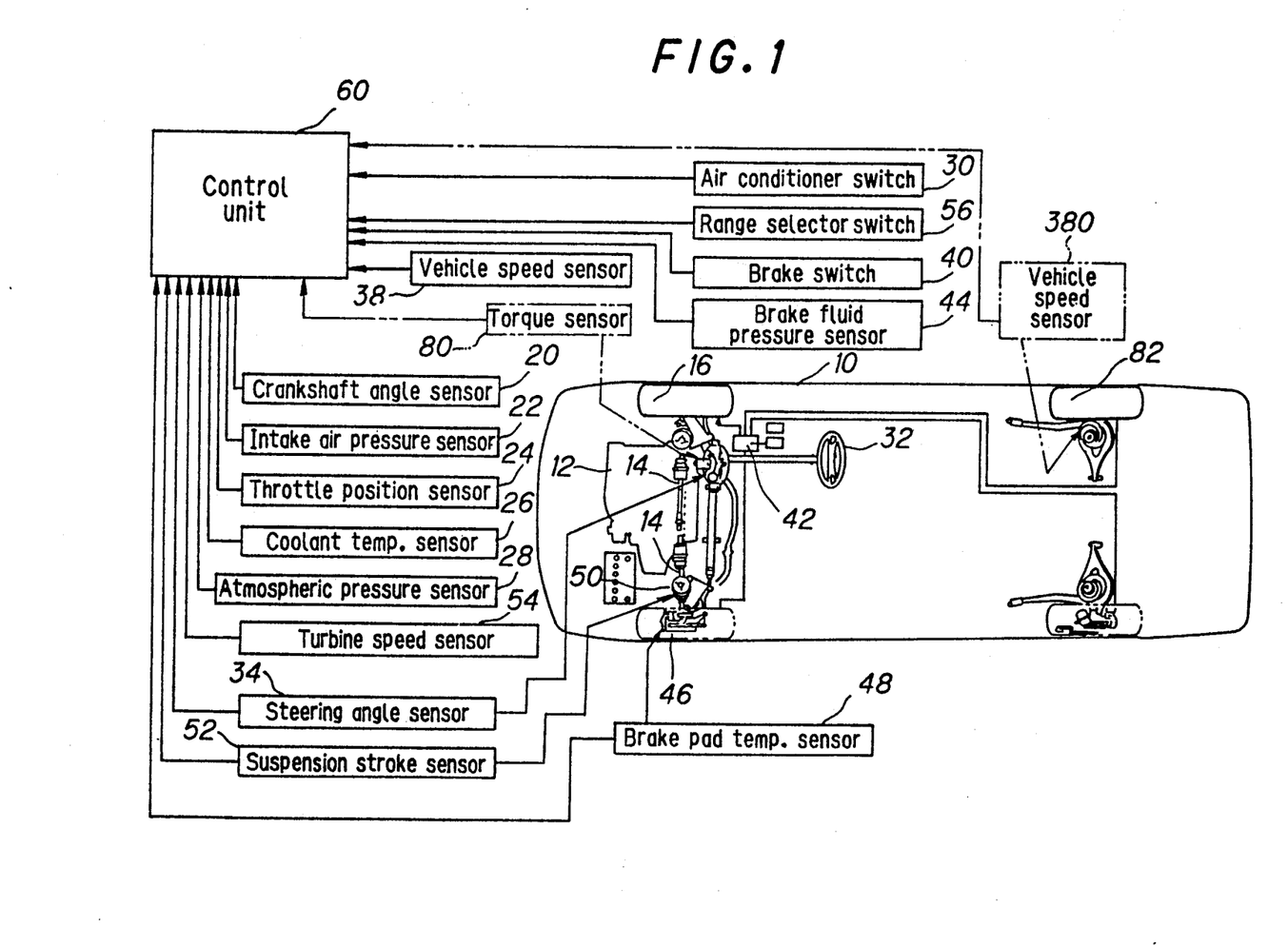
FIG. 1 is schematic diagram showing the overall arrangement of a vehicle automatic transmission control system according to the present invention.

FIG. 1 is a schematic diagram showing the overall arrangement of the system, in which the reference numeral 10 denotes a vehicle. The vehicle 10 has an internal combustion engine and a drive train, generally denoted by the reference numeral 12, which transmits the gear-shifted engine output to, through a drive shaft 14, front (drive) wheels 16. A crankshaft angle sensor 20 is provided in a distributor (not shown) of the engine to detect the position of a piston (not shown) in terms of the crankshaft angle. At an appropriate location downstream of a throttle valve (not shown), there is provided an intake air pressure sensor 22 for detecting the absolute pressure of the intake air flowing through an air intake passage. In the vicinity of the throttle valve, there is provided a throttle position sensor 24 for detecting the degree of opening of the throttle valve. Further, there are provided, at appropriate locations of the air intake passage, a temperature sensor 26 for detecting the coolant temperature and a pressure sensor 28 for detecting the atmospheric pressure of a place where the vehicle 10 travels. Moreover, there are provided in the vehicle 10 an air conditioner switch 30 for detecting ON/OFF states of an air conditioner (not shown) and a steering angle sensor 34 for detecting the turning angle of the front wheels 16 through the amount of rotary motion of a steering wheel 32.

In addition, a vehicle speed sensor 38 is provided in an appropriate location in the engine/drive train 12 for detecting a traveling speed of the vehicle 10. In the vicinity of a brake pedal (not shown) prepared on the vehicle floor near the driver's seat a brake switch 40 is provided for detecting depression of the brake pedal. And are further provided a brake fluid pressure sensor 44 for detecting the brake pressure through the fluid pressure at a brake master cylinder 42 and temperature sensor 48 for detecting the temperature of a friction pad (not shown) in a disc brake 46 provided at each wheel. In the vicinity of a suspension 50 mounted at each wheel a suspension stroke sensor 52 is provided for detecting the weight of the passenger(s) and cargo of the vehicle through the amount of depression of a coil spring (not shown) of the suspension 50.

Furthermore, a turbine speed sensor 54 is provided for detecting the rotational speed of the turbine shaft of a torque converter (not shown) in the engine/drive train 12. A range selector switch 56 is provided for detecting the selected position of a range selector (not shown) prepared near the driver's seat. Outputs of the sensors and switches are all sent to a control unit 60.

Figure 2:
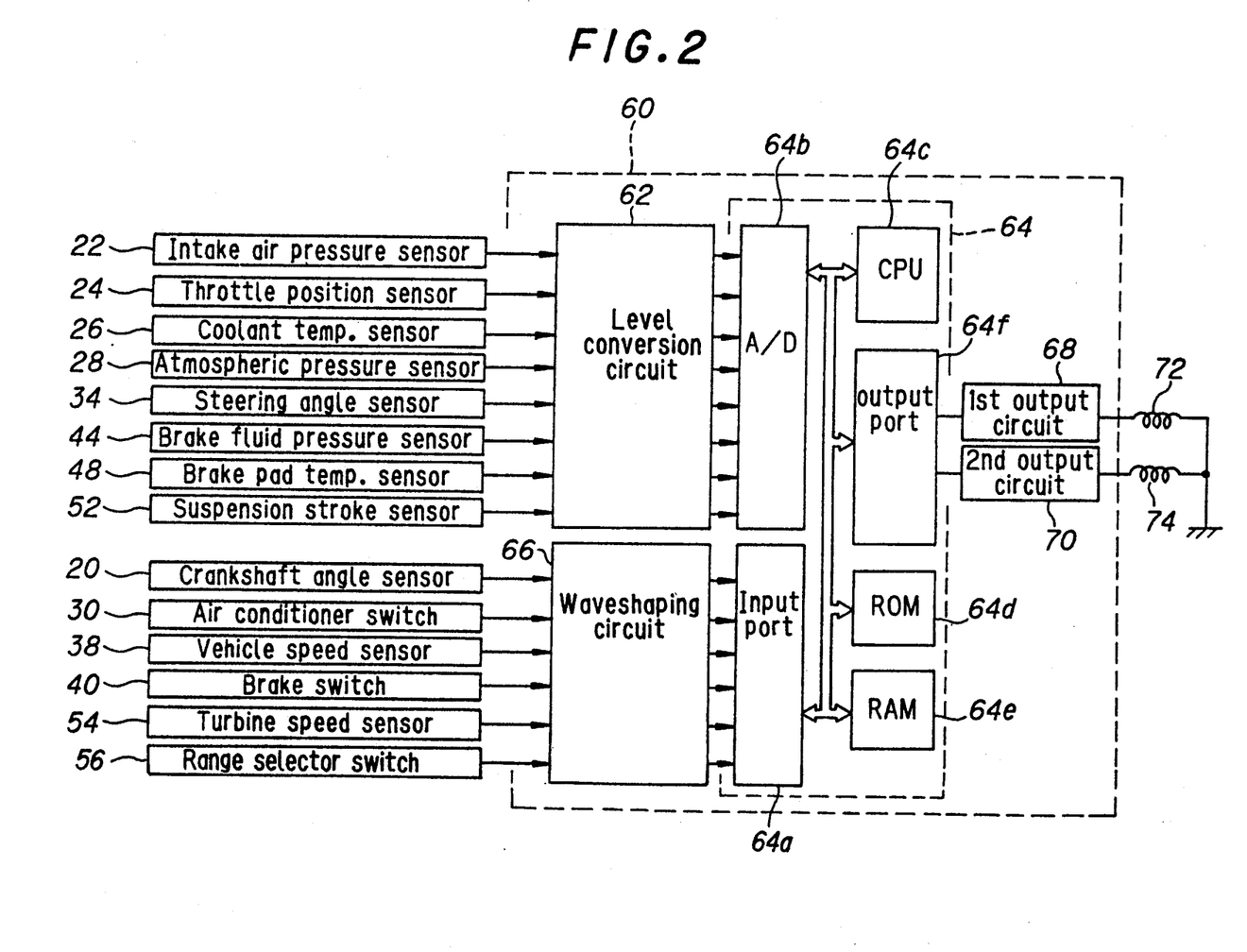
FIG. 2 is a block diagram showing the details of the control unit shown in FIG. 1.

FIG. 2 is a block diagram showing the control unit 60 in details. As shown in this figure, the analog outputs from the intake air pressure sensor 22 and the like are input to a level conversion circuit 62 in the unit for amplification and the amplified signals are forwarded to a microcomputer 64. The microcomputer 64 has an input port 64a, an A/D converter 64b, a CPU 64c, a ROM 64d, a RAM 64e, an output port 64f and groups of registers (not shown) and counters (not shown). The output from the circuits 62 is input to the A/D converter 64b whereby it is converted into digital values, and the values are stored in the RAM 64e. The outputs from the crankshaft angle sensor 20 and the like are first waveshaped in a waveshaping circuit 66 and then input to the microcomputer through the input port 64a to be stored in the RAM 64e. On the basis of the input values and calculated values derived therefrom, the CPU 64c determines a gear position (ratio). In response to the result of the determination, a control value is sent through the output port 64f to a first output circuit 68 and a second output circuit 70 which energize/deenergize solenoids 72, 74 so as to shift gears or hold the current position as determined.

In the above, since a noise caused by a vehicle vibration excited by the engine could be detected by the vehicle speed sensor 38 and mixed up with its output, it is arranged such that a digital filtering is carried out on the vehicle sensor output in the microcomputer and the vehicle speed is determined from a frequency component less than the noise frequency. In actual fact, most noises mixed in the vehicle speed sensor output is this vibration which is generated by torsional vibration of the drive shaft caused by a time lag in engine torque transmission.

The operation of the control system will now be explained with respect to the flow charts of FIG. 3 and later figures. The procedure begins with step S10 of FIG. 3 in which the vehicle speed, the throttle opening, the driving resistance and other parameters required for determining the control value are detected or calculated. Control then passes to step S12 in which the gear ratio (gear position) is selected through fuzzy reasoning and to step S14 in which in response to the so-determined gear ratio a control value is output to the solenoids 72,74. The fuzzy reasoning is conducted using a number of fuzzy production rules (see the example shown in FIG. 4) which are drafted in advance. The detected (calculated) parameters relating to the antecedent (IF part) of each rule are applied to the corresponding membership functions (as indicated by the broken lines in FIG. 4) for determining the degree of satisfaction of the rule, whereafter the output value of the consequent (THEN part) is determined. After all of the rules have been processed in this way, the final control value is determined. This is explained in detail in the aforesaid assignee's earlier publication, and since the present invention is not characterized by the fuzzy reasoning itself but by a method of calculating driving resistance as a parameter required for conducting the fuzzy reasoning, it will not be gone into further here.

Figure 5:
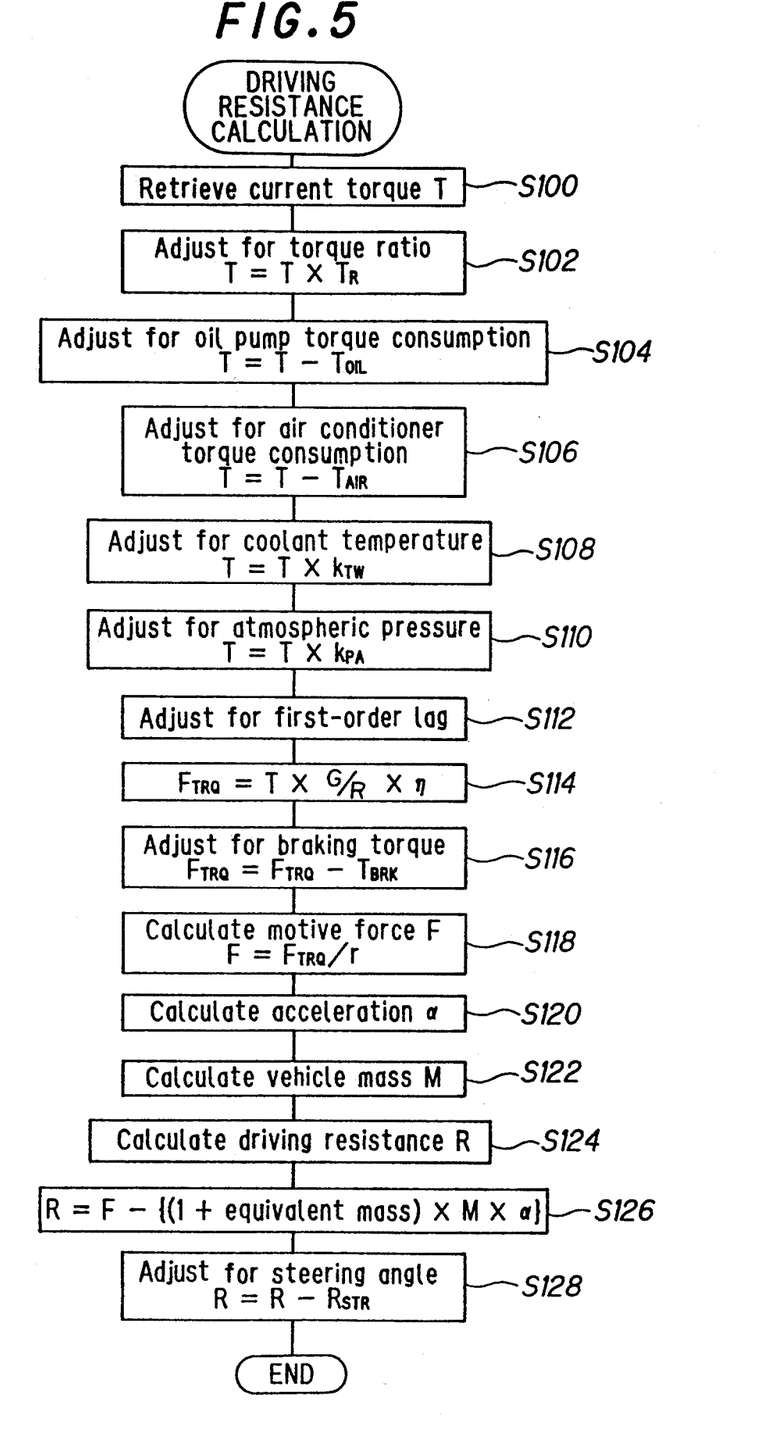
FIG. 5 is a subroutine flow chart showing driving resistance calculation referred to in FIG. 3 flow chart.

FIG. 5 is the flow chart of a subroutine for calculating the driving resistance. Before going into a detailed explanation of this subroutine, however, the principle of the calculation will be explained with reference to FIG. 6. The invention uses the law of motion for determining the driving resistance. Specifically, the vehicle dynamics can be obtained from the law of motion as Motive force $F$ − Driving resistance $R =$ (1)

Figure 6:
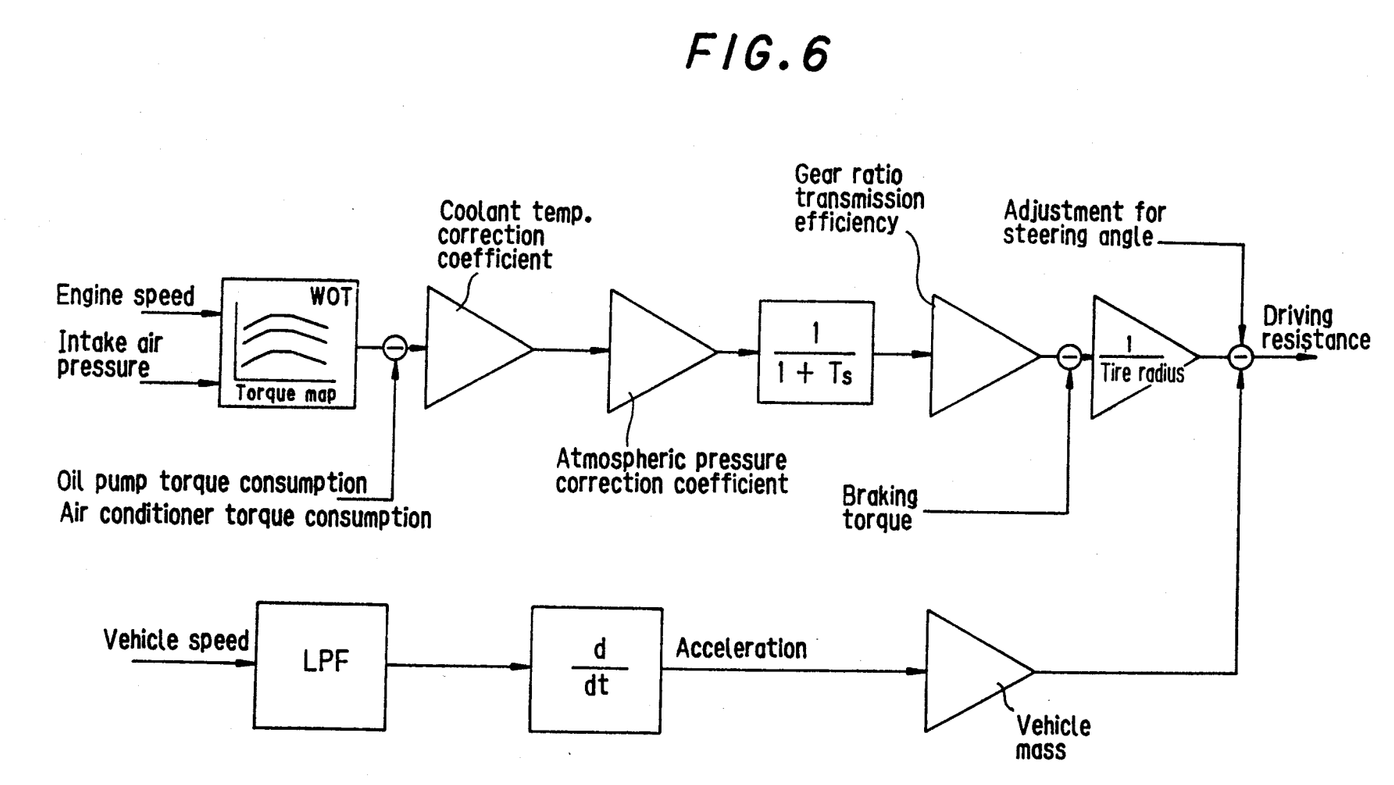
FIG. 6 is an explanatory block diagram explaining the calculation of FIG. 5 flow chart.

$(1 +$ Equivalent mass$) \times$ (Vehicle weight $W$/Gravitational acceleration $G$) $\times$ Acceleration $\alpha$ [kg]

On the other hand, the motive force F and the driving resistance R can be obtained as Motive force $F =$ (Torque $T \times$ Overall gear ratio$G/R \times$ (2)

Transmission efficiency eta)/Effective tire radius $r$ [kg]

Driving resistance $R =$ (Rolling resistance $\mu o +$

Grade sin $\theta$) $\times$ Vehicle weight $W +$

Vehicle weight $W +$ Aerodynamic drag ($\mu A \times V^2$)[kg]

(In the foregoing, the equivalent mass (equivalent mass coefficient) is a constant and V is the vehicle speed.)

The variables in the equation (2) are the vehicle weight W, which varies with the number of passengers and the amount of cargo, and the grade sin $\theta$, which differs depending on the inclination of the road surface, and all of these factors are included in the driving resistance. Therefore, by rewriting the aforesaid equation (1) there is obtained Driving resistance $R=$(Motive force
$F$)−{$(1+$equivalent mass)$\times$Vehicle mass
$M\times$Acceleration $\alpha$} [kg]

(where vehicle mass M=vehicle weight W/gravitational acceleration G). FIG. 6 illustrates the foregoing in the form of a block diagram.

Figure 7:
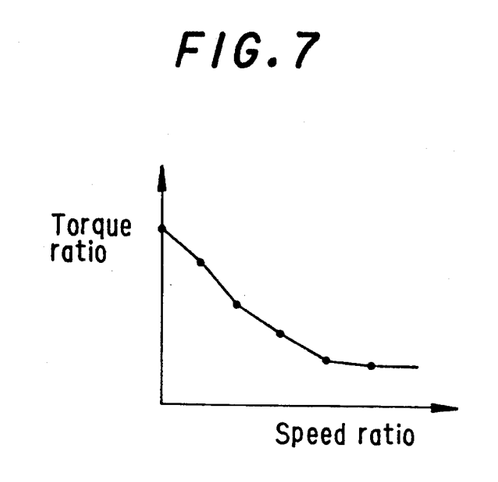
FIG. 7 is a graph explaining the characteristics of a torque ratio defined with respect to a speed ratio and referred to in FIG. 5 flow chart.

The flow chart of FIG. 5 will now be explained with reference to FIG. 6. The subroutine starts with step S100 in which the current torque is determined. This embodiment does not use a torque sensor but, as shown in FIG. 6, obtains the approximate value of the torque by retrieval from a map stored in ROM, using the engine speed and the intake air pressure as address data. As shown in FIG. 6, the torque map is provided with separate sets of characteristics for different throttle openings. Control then passes to step S102 in which the torque T is adjusted by multiplication by a torque ratio TR indicative of a torque increase by the torque converter retrieved from a table having the characteristics shown in FIG. 7. This retrieval is conducted by calculating the speed ratio e of the torque converter from the engine speed and the torque converter output speed and using the calculated value to retrieve the torque ratio TR from the table of FIG. 7.

Figure 8:
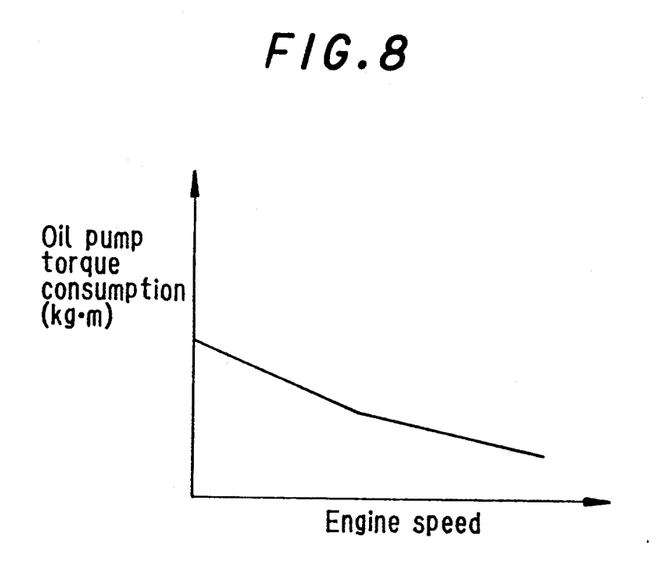
FIG. 8 is a graph explaining the characteristics of oil pump torque consumption correction defined with respect to an engine speed and referred to in FIG. 5 flow chart.
Figure 9:
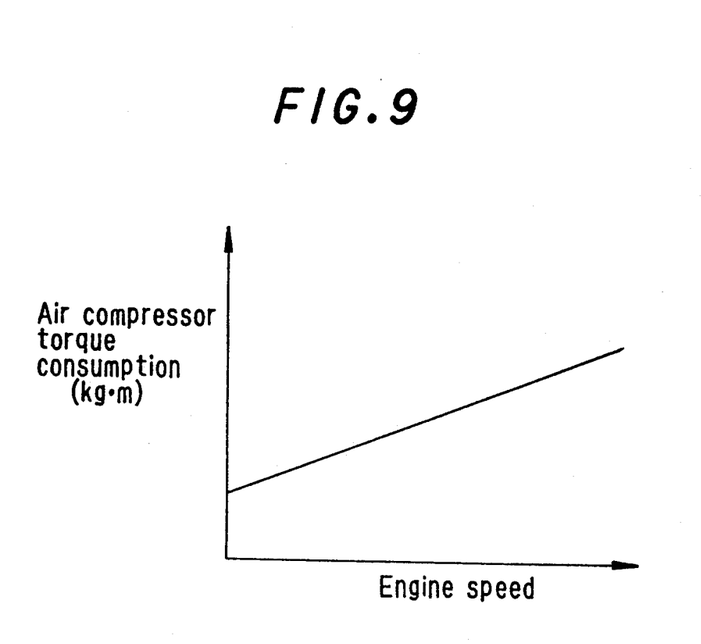
FIG. 9 is a graph explaining the characteristics of air conditioner torque consumption correction defined with respect to an engine speed and referred to in FIG. 5 flow chart.
Figure 10:
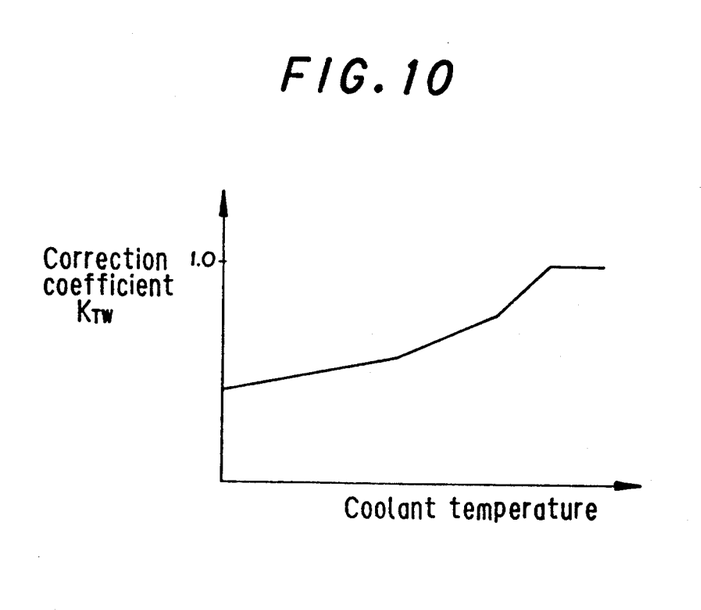
FIG. 10 is a graph explaining the characteristics of coolant temperature correction referred to in FIG. 5 flow chart.

Control then passes to steps S104 and S106 in which the amounts of torque consumed by the oil pump and the air conditioner compressor are estimated and subtracted from the torque value to obtain an adjusted torque value. This is done by using the engine speed to retrieve the values from tables stored in the ROM 64d having the characteristics shown in FIGS. 8 and 9. The retrieval is conducted using the engine speed since the rotational speeds of both the oil pump and the compressor are proportional to the engine speed. Characteristics like those shown in the figures are determined by tests and stored in ROM beforehand. Control next passes to step S108 in which the torque is adjusted for the coolant temperature. This adjustment is made because the coolant temperature is an index of the engine temperature, and the torque loss owing to internal engine friction is large when the engine is cold. Specifically, the calculated torque is adjusted by multiplying it by a correction coefficient kTW. As shown in FIG. 10, the correction coefficient kTW is small on the low-temperature side and rises to 1.0 at full warmup.

Figure 11:
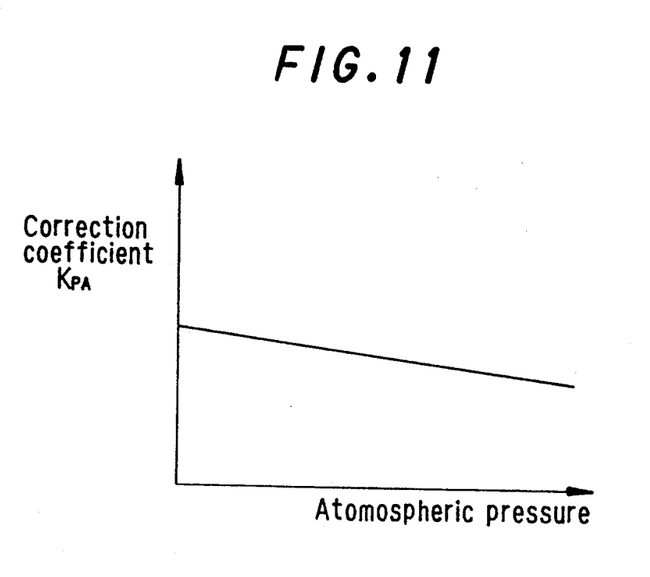
FIG. 11 is a graph explaining the characteristics of atmospheric pressure correction referred to in FIG. 5 flow chart.

Control then passes to step S110 in which the torque is adjusted for the atmospheric pressure. This adjustment is conducted because back pressure decreases with increasing altitude and, accordingly, for one and the same intake air pressure, the engine output increases in proportion to the altitude. The calculated torque is therefore adjusted by multiplying it by a correction coefficient kPA which increases with increasing altitude, as shown by the characteristic curve of FIG. 11. Following this, the calculated torque is adjusted for torque transmission lag in step S112. This is conducted because the gear system and various other factors delay the transmission of the torque output by the engine to drive wheels. As far as the inventors have been able to determine, the lag is of the first order. Therefore, step S112 adjusts the calculated torque for lag by an amount determined by a time constant shown in FIG. 6.

Control then passes to step S114 in which the calculated (adjusted) torque is multiplied by the overall gear ratio G/R and the transmission efficiency eta to obtain the value FTRQ. When the torque converter speed ratio e is 1.0 or larger, the engine is forcibly rotated by the drive wheels so that the engine provides an engine braking effect. Generally, the transmission efficiency differs between this case and the ordinary case where the engine drives the wheels. The value of the transmission efficiency used in the calculation is therefore changed between the case of e<1.0 and the case of e≧1.0. Specifically, it is adjusted downward when e is 1.0 or larger.

Figure 12:
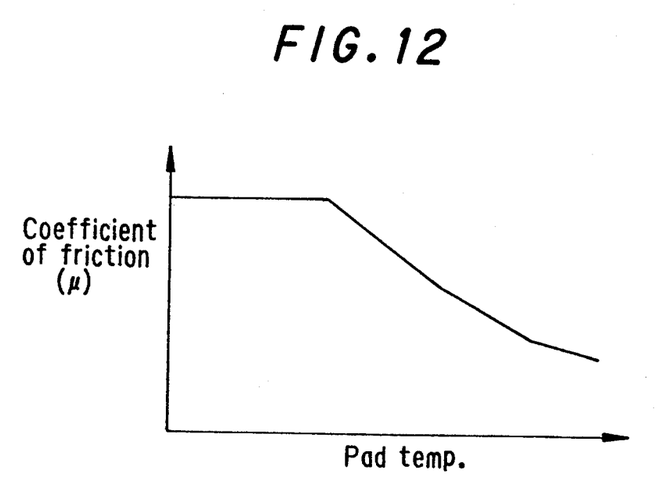
FIG. 12 is a graph explaining the characteristics of a friction coefficient of brake pads to be used for braking torque correction referred to in FIG. 5 flow chart.
Figure 13:
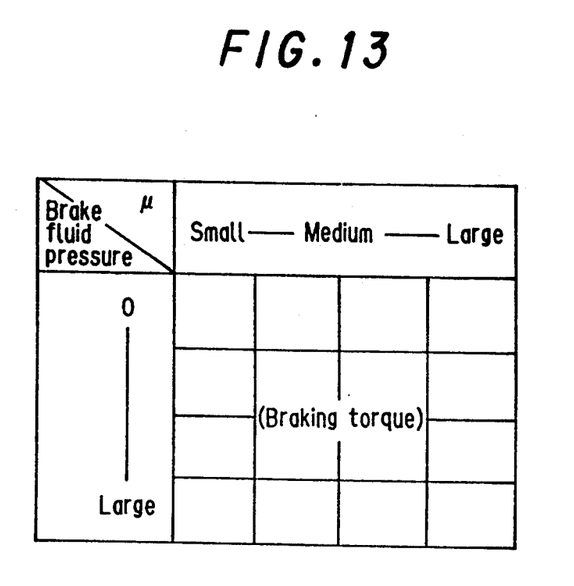
FIG. 13 is an explanatory view showing the characteristics of a map of the braking torque correction to be retrieved from the friction coefficient and brake fluid pressure referred to in FIG. 5 flow chart.

Control next passes to step S116 in which the braking torque (braking force) is determined and subtracted from the calculated value FTRQ so as to compensate for the torque loss experienced during braking. The braking torque is determined by using the temperature of the brake pads of the disc brakes detected by the sensor 48 for retrieving a coefficient of friction $\mu$ from a table whose characteristics are shown in FIG. 12, and then retrieving the braking torque from a map whose characteristics are shown in FIG. 13 using the coefficient of friction $\mu$ and the brake fluid pressure detected by the sensor 44 as address data. The braking force increases with increasing coefficient of friction and increasing brake fluid pressure and the pattern of this increase relative to these factors is determined through tests and stored in the ROM 64d as a map, the characteristics of which is shown in FIG. 13. Here, the brake pad temperature may be determined by averaging those values detected at all wheels, or may be determined from an average between those detected at the two front wheels 16.

Next the motive force F is calculated in step S118 by dividing the value FTRQ obtained in step S116 by the radius of the drive wheels 16.

Control thereafter passes to step S120 in which the acceleration α is determined by obtaining the difference or differential of the detection value of the vehicle speed sensor 38 obtained by filter processing in the manner described earlier, to step S122 in which the actual vehicle mass (weight) M including the mass (weight) of the passengers and any cargo is determined from the detection value of the suspension stroke sensor 52 based on predetermined characteristics, and to step S126 in which the driving resistance R is calculated according to the equation set out earlier.

Figure 14:
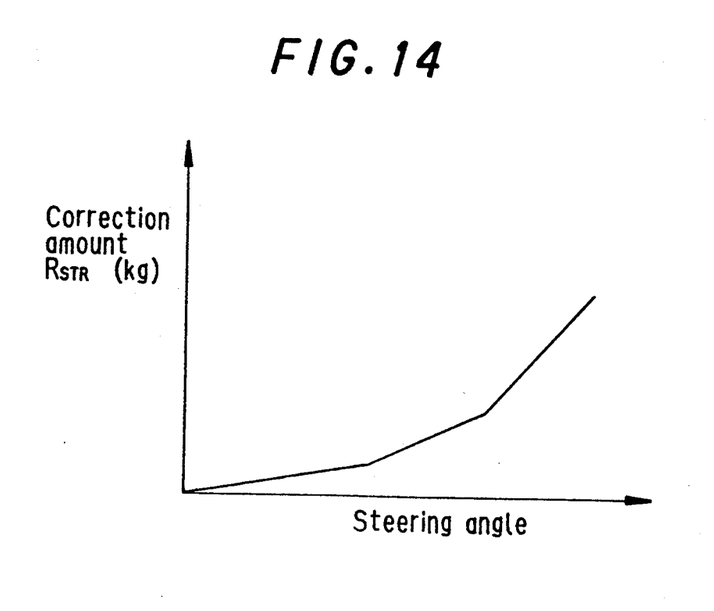
FIG. 14 is a graph explaining the characteristics of a steering angle correction referred to in FIG. 5 flow chart.

Control then passes to step S128 in which the calculated driving resistance R is adjusted for the steering angle. This adjustment is made because the tire slip rate varies with the direction of the drive wheels travel and this in turn produces a variation in the driving resistance. Specifically, the steering angle detected by the sensor 34 is used for retrieving a correction amount RSTR from a table whose characteristics are shown in FIG. 14 and the retrieved value is subtracted from the calculated driving resistance. Alternatively, this adjustment can be made by subtracting the correction amount from the motive force.

Figure 3:
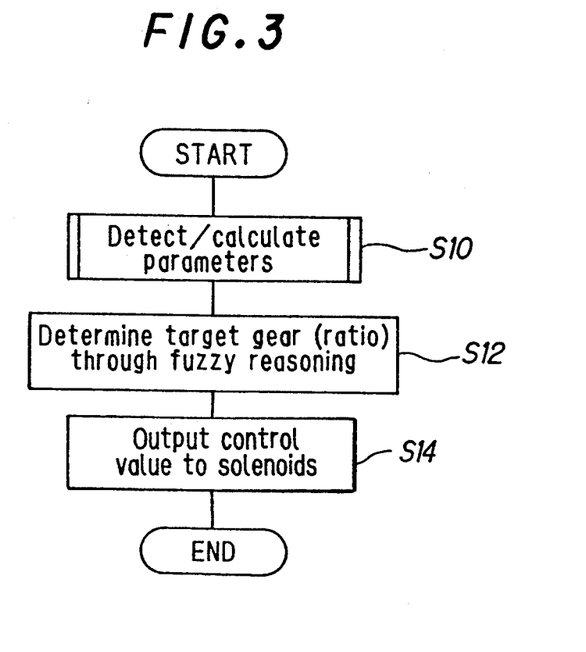
FIG. 3 is a main routine flow chart showing the operation of the control system according to the present invention.

The gear ratio is determined according to the flow chart of FIG. 3 based on the so-obtained driving resistance and the other operating parameters.

The embodiment constituted in the foregoing manner is able to determine the driving resistance with high precision solely through data processing operations, without use of a torque sensor and, therefore, is able to determine gear ratios (positions) appropriate for hillclimbing and other driving circumstances with high reliability.

Figure 4:
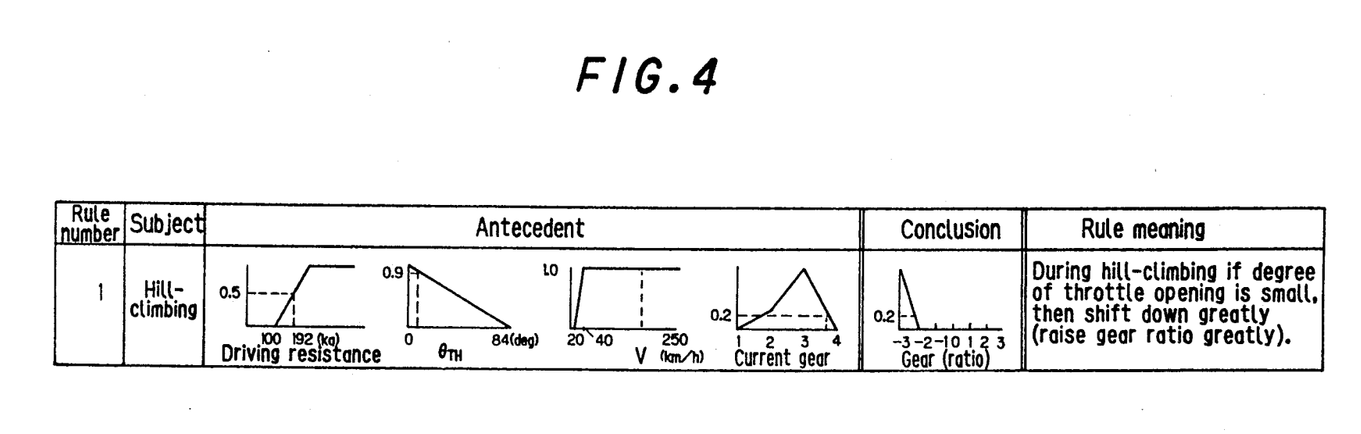
FIG. 4 is a chart showing an example of fuzzy production rule used in a fuzzy reasoning referred to in FIG. 3 flow chart.
Figure 15:
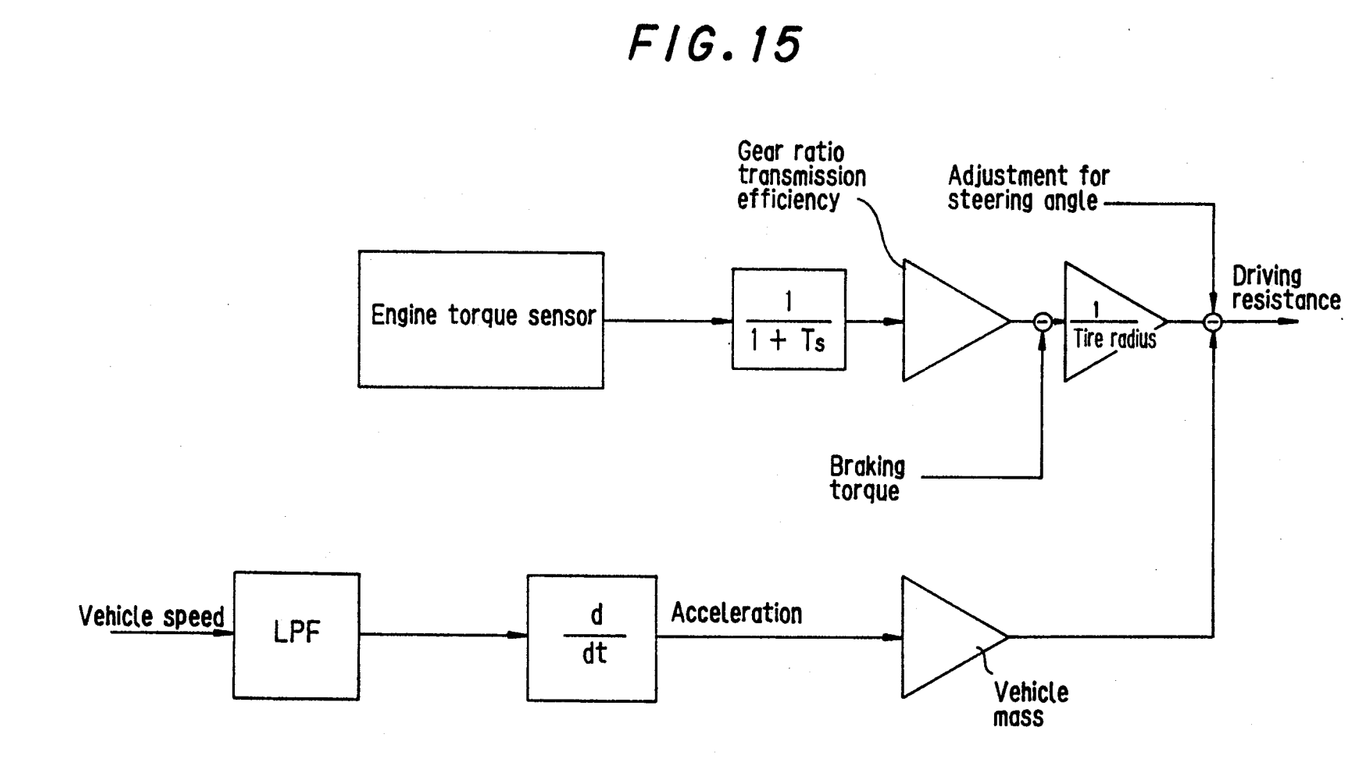
FIG. 15 is an explanatory block diagram showing a second embodiment of the present invention.

FIG. 15 shows a block diagram of a second embodiment of the invention. This embodiment uses a torque sensor for detecting the torque of an engine output shaft (transmission input shaft)(not shown) in the engine/drive train 12 shown in FIG. 1. In this embodiment, therefore, it suffices to start the calculation of the driving resistance from an operation for adjusting the value detected by the sensor to compensate it for the firstorder lag. Since the operations of steps S100-S110 of the flow chart of FIG. 4 are therefore unnecessary, the calculation is simplified.

Figure 16:
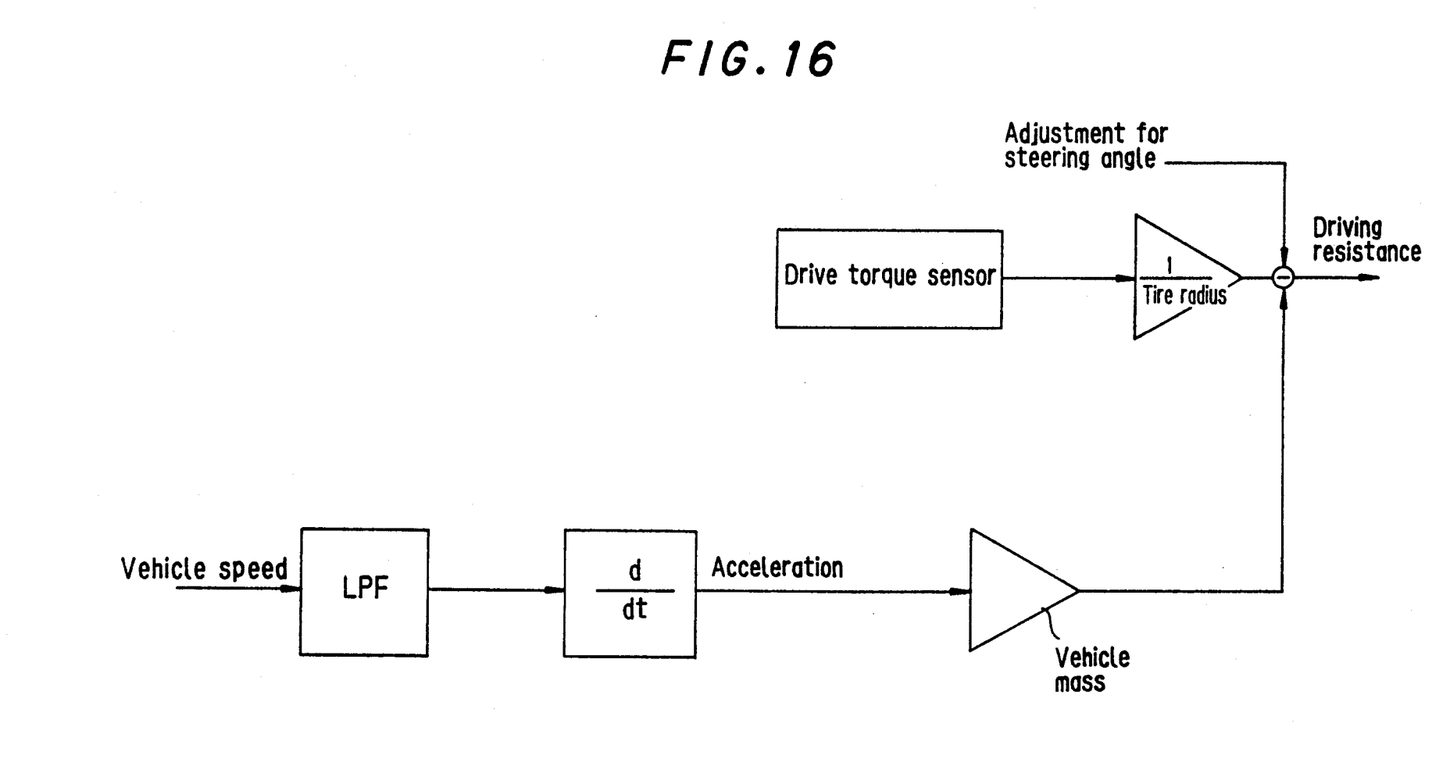
FIG. 16 is an explanatory block diagram showing a third embodiment of the present invention.

FIG. 16 shows a block diagram of a third embodiment of the invention. Like the second embodiment, this embodiment also uses a torque sensor, specifically a torque sensor 80 which, as shown by a phantom line in FIG. 1, is mounted at a position where it can detect the torque output at a drive shaft 14. Since this enables direct detection of the actual motive force, the calculation is simpler than in the second embodiment.

The positioning of a vehicle speed sensor 380 indicated by a phantom line in FIG. 1 is that used in a fourth embodiment of the invention. In this embodiment, the sensor 380 is mounted in the vicinity of a free wheel (rear wheel) 82 so as to avoid detection of noise frequencies arising from the vibration. This embodiment therefore does not require the digital filter processing used in the first embodiment. Since the sensor 380 is mounted on the free wheel, not on the drive wheel, this arrangement can also prevent the vehicle speed detection from being affected even if the drive wheel slips.

While the invention has been described with respect to the case where the driving resistance is determined and fuzzy reasoning is conducted on the basis of operating parameters including the driving resistance for selecting the gear position of a multi-step transmission, this is not limitative and, insofar as the driving resistance is determined and used as a parameter for selecting the control value, the invention can also be applied for selecting the gear ratio of a continuously variable transmission or of either a multi-step transmission or a continuously variable transmission using the conventional shift diagram map.

The present invention has thus been shown and described with reference to the specific embodiments. However, it should be noted that the present invention is in no way limited to the details of the described arrangements but changes and modifications may be made without departing from the scope of the appended claims.

What is claimed is:

1. A system for controlling a gear ratio of a multi-step geared or continuously variable automatic transmission of a vehicle based on determined parameters indicative of operating conditions of said vehicle including a driving resistance calculated by driving resistance calculating means;

wherein the improvement comprises:

said driving resistance calculating means comprising:

first means for determining output torque generated by a vehicle engine at least from an engine speed and an engine load in accordance with a predetermined characteristic;

second means for adjusting said determined output torque by subtracting torque consumption of a least one device including an oil pump to be driven by said vehicle defined with respect to an engine speed and adjusting for transmission lag, deeming the lag as the first order, and for calculating motive force said vehicle generates by multiplying said adjusted torque by overall gear ration and transmission efficiency and by dividing the product by vehicle tire radius;

third means for determining a vehicle acceleration from a frequency signal less than a determined frequency and by multiplying said determined vehicle acceleration by vehicle mass, to determine force required for acceleration, and then to determine a driving resistance by subtracting the determined force from the motive force;

fourth means for determining a steering angle of said vehicle; and fifth means for adjusting said determined driving resistance in response to the magnitude of said detected steering angle in such a manner that said determined driving resistance decreases with increasing magnitude of said detected steering angle.

2. A system according to claim 1, wherein said torque consumption of a device to be driven by said vehicle engine is torque consumption of an air conditioner.

3. A system according to claim 1, further including sixth means for adjusting said determined torque by an engine coolant temperature.

4. A system according to claim 1, further including seventh means for adjusting said determined torque by an atmospheric pressure at a place where said vehicle travels.

5. A system according to claim 1, further including eight means for varying said transmission efficiency if said vehicle engine is driven by vehicle wheels.

6. A system according to claim 1, further including ninth means for determining braking force at least from brake hydraulic pressure and a brake pad temperature to adjust said determined motive force by subtracting said determined braking force therefrom.

7. A system according to claim 1, wherein said vehicle acceleration is determined by a sensor provided at a vehicle drive wheel.

8. A system according to claim 1, wherein said vehicle acceleration is determined by a sensor provided at a vehicle free wheel.

9. A system for controlling a gear ratio of a multi-step geared or continuously variable automatic transmission of a vehicle based on determined parameters indicative of operating conditions of said vehicle including a driving resistance calculated by driving resistance calculating means, while carrying out a fuzzy reasoning on a preestablished fuzzy production rule to determine the gear ration to be shifted to; wherein the improvement comprises:

said driving resistance calculating means comprising:
a torque sensor for detecting at least one of either an engine output torque or a vehicle drive torque;
first means for detecting a steering angle of said vehicle;
second means for determining a vehicle acceleration to multiply it by a mass of said vehicle to determine a force required for acceleration and for determining a driving resistance by subtracting said determined force from an output value of said torque sensor; and
third means for adjusting the output value of at least one of either said torque sensor or said determined driving resistance in response to the magnitude of said detected steering angle in such a manner that the output value or said determined driving resistance decreases with increasing magnitude of said detected steering angle.

* * * * *